G. HILGERS.
TACKLE BLOCK.
APPLICATION FILED OCT. 17, 1919.
1,356,363. Patented Oct. 19, 1920.
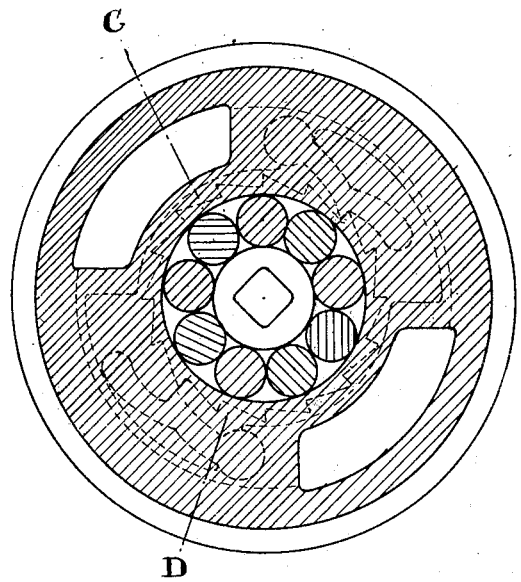
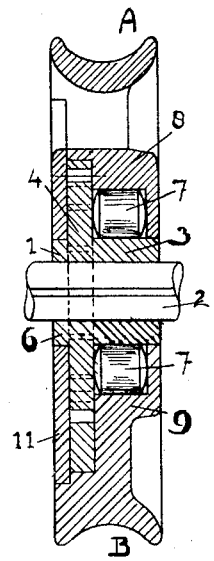
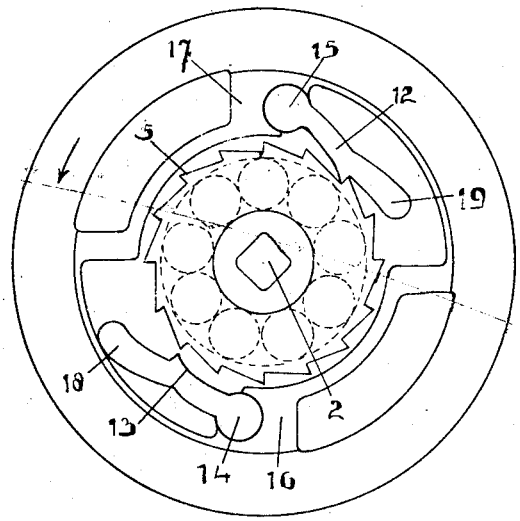
Inventor
Gerrit Hilgers.
Attorney

UNITED STATES PATENT OFFICE.

GERRIT HILGERS, OF ROTTERDAM, NETHERLANDS.

TACKLE-BLOCK.

1,356,363.   Specification of Letters Patent.   Patented Oct. 19, 1920.

Application filed October 17, 1919. Serial No. 331,418.

*To all whom it may concern:*

Be it known that I, GERRIT HILGERS, subject of the Queen of the Netherlands, residing at Rotterdam, Netherlands, Bothastraat 23ᴮ, have invented certain new and useful Improvements in Tackle-Blocks; and I do hereby declare the following to be a full, clear, and exact description of the invention, such as will enable others skilled in the art to which it appertains to make and use the same.

This invention relates to an improvement in tackle blocks in which at least one of the pulleys has rigidly fixed to it a ratchet wheel adapted to be engaged by a spring-pressed pawl pivoted to the body or frame of the block the arrangement being such that the said pulley is prevented from rotating in a lowering direction so that to lower a load the rope must slide over the non-rotating pulley, a cord or the like being so connected to the pawl that by pulling the same the pawl can be raised in order to free the pulley.

The object of the present invention is to provide an improved construction in which the mechanism is entirely inclosed in the pulley of the ordinary width and whereby all springs are avoided. The known sheaves of existing tackle blocks and the like may therefore simply be replaced by the sheaves according to the invention without any further alteration of the tackle being necessary.

In the accompanying drawings

Figure 1 is a section of a sheave according to the invention, corresponding to the line A—B of Fig. 2.

Fig. 2 is a sectional view of the sheave corresponding to the line C, D of Fig. 1.

Fig. 3 is a side view of the sheave with the side ring removed.

The member or boss 1 of the sheave through which the bolt 2 passes has the same width as the sheave and consists of a cylindrical part 3 and a flange 4 provided with teeth 5, while at the same side as the flange 4, the member terminates in a short cylindrical part 6. Around the cylindrical part 3 are located rollers 7 inclosed by the hub 8 of the pulley. Said rollers are locked in the sheave by means of a flange 9 of the hub 8.

At the opposite side of the sheave a side ring 11 of the same width as the cylindrical part 6 of the member 1 is secured which ring closes off the flange or ratchet wheel 4 and at the same time shuts off the pawls 12 and 13 which are provided with cylindrical parts or pivots 14 and 15 which are located in cylindrical recesses in the hub of the sheave in such a manner that the parts or pivots 14 and 15 are for the greater part inclosed, by the portions 16 and 17, Fig. 3, of the hub 8, allowing the pawls to turn about the cylindrical parts or pivots 14 and 15. The pawls are provided with weights 18 and 19 which move the pawls into contact with the teeth of the ratchet wheel 4 when the pawl is above the horizontal plane through bolt 2. One of the two pawls will therefore always be in engagement.

It will be seen that the construction is very simple and reliable as springs are avoided while the mechanism is totally inclosed in the sheave so that access of sea water and moisture is prevented as much as possible.

It will be readily understood that the sheave can rotate in the direction of the arrow in Fig. 3 while it cannot rotate in the opposite direction as the member 1 on the bolt 2 cannot rotate.

Having now particularly described and ascertained the nature of my said invention and in what manner the same is to be performed, I declare that what I claim is:—

1. A pulley, comprising a fixed sleeve provided with an annular flange having ratchet teeth on its periphery, a pulley mounted to turn on the sleeve and having an annular recess in its hub, closed by said flange, rollers in the recess and engaging the sleeve, and oppositely arranged weighted pawls mounted on the hub and adapted to alternately engage the ratchet teeth.

2. A pulley, comprising a fixed sleeve having adjacent one end a flange provided with ratchet teeth on its periphery, a pulley mounted to turn on the sleeve and having in its hub an annular recess closed by the flange of the sleeve, rollers in the said recess and engaging the sleeve, weighted pawls mounted on the hub for alternately engaging the ratchet teeth, and a ring fitting on the end of the sleeve and secured to the pulley over the pawls.

GERRIT HILGERS.